3,011,870
PROCESS FOR PREPARING VIRTUALLY
PERFECT ALUMINA CRYSTALS
Watt W. Webb, Lewiston, and William A. Wissler and William D. Forgeng, Niagara Falls, N.Y., assignors to Union Carbide Corporation, a corporation of New York
No Drawing. Filed Sept. 5, 1958, Ser. No. 759,149
10 Claims. (Cl. 23—142)

This invention relates to single crystals of aluminum oxide and, more particularly, to single crystals of alpha-aluminum oxide characterized by a virtually perfect structure.

Certain small crystals of various metals and compounds exhibiting unusually high strengths have been discovered and produced. The very high mechanical properties of these crystals are generally attributed to the lack of those structural defects in these crystals which are always present in ordinary crystals. Numerous crystal defects, i.e., dislocations, prevent metals and compounds from displaying the strengths they theoretically should possess. It has been hypothesized that if a crystal could be produced free of these structural defects, it would possess a much higher strength than ordinarily observed for that substance. These near perfect crystals do possess a nearly theoretical strength and have thereby found a place of importance in industry for use as springs, gauging elements and miniature electronic components.

Crystals of this type are usually formed or "grown" by controlled deposition from the vapor state. Among the many substances which have been crystallized into nearly perfect structures are the elements iron, silicon, germanium, cadmium, zinc, silver, tungsten and some compounds, such as cadmium sulfide and sodium chloride. For those of these substances which are relatively easily volatilized, the crystallization process involves simple vaporization and condensation. For those that are relatively non-volatile, more complicated processes are required involving chemical reactions that occur at least partially in the vapor state or in a liquid solution. For example, to crystallize a non-volatile metal such as tungsten, a volatile tungstate is first vaporized, and then, while in the vapor state reduced to the elemental form by reacting with gaseous hydrogen. The elemental tungsten vapor thus formed is subsequently deposited in a crystalline form. However, the crystallization of extremely non-volatile substances presents further problems. There is at present no means available for crystallizing into near perfect form such extremely non-volatile substances as alpha-aluminum oxide.

The primary object of the present invention, therefore, is to provide a method of producing virtually perfect single crystals of alpha-aluminum oxide.

It is a further object of the present invention to provide a method of producing virtually perfect platelets of alpha-aluminum oxide of thickness of the order of 10,000 angstrom units.

It is another object of the present invention to provide a method of producing virtually perfect hollow needles of alpha-aluminum oxide of inside diameter of the order of 10,000 angstrom units.

Other aims and advantages of the invention will be apparent from the following description and the appended claims.

The process which satisfies the objects of the present invention comprises the steps of heating an aluminum source material to obtain molten aluminum, commingling the molten aluminum with hydrogen gas and water vapor whereby the aluminum is oxidized to vaporous aluminum monoxide, and allowing the vaporous aluminum monoxide to condense on an alumina substrate, whereby the condensed aluminum monoxide disproportionates to solid aluminum oxide (the sesquioxide) and liquid aluminum, the solid sesquioxide assuming the crystalline structure of alpha-aluminum oxide.

The source of the aluminum is not limited to pure metal but can also be supplied by heating intermetallic compounds thereof, such as the aluminides of groups IVB, VB, and VIB, of the periodic table (Lange, Handbook of Chemistry, Handbook Publishers, Inc., Sandusky, Ohio, 1956, pp. 56–57).

In the practice of the invention, molten aluminum metal or an aluminum source material is heated to between 1300° C. and 1450° C. In principle, the process can operate at temperature up to the melting point of alpha-aluminum oxide, 2050° C., but the preferred range is between 1300° C. and 1450° C. The proportion of water vapor to be used should be between $10^{-6}$ and $10^{-1}$ atmosphere. The ratio of water vapor pressure to hydrogen gas pressure should be between $10^{-8}$ to 1 and 1 to 1. The molten aluminum is caused to react with the atmosphere of hydrogen and water vapor producing gaseous aluminum monoxide. The resulting atmosphere is then exposed to a suitable substrate whereupon virtually perfect single crystals of alpha-aluminum oxide form.

The apparatus used may be of any suitable design having provision for the passage of the reacting gases, such as a conventional tubular electric-resistance furnace. The charge may be heated in contact with any suitable refractory, such as commercial aluminum oxide refractory.

The crystals produced by the process of this invention have the shape of platelets and needles having the following characteristics. The platelets are from 0.5 to 10 microns thick and up to 10 mm. long. The $\langle 00 \cdot 1 \rangle$ direction is perpendicular to the platelet surface, and the traces of the sides of the hexagonal growth steps on the $(00 \cdot 1)$ plane approximate $(11 \cdot 1)$ The needles are from 1 to 30 mm. long and from 3 to 50 microns across with hexagonal cross sections and frequently rather sharp tips. The needles are single crystals, with the $\langle 00 \cdot 1 \rangle$ direction parallel to the principal direction of growth. Concurrent with the formation of platelets and needles are platelets and needles each having a small, cylindrical centerline cavity which has the effect of transforming the needles into tubelets. These cylindrical cavities vary from less than half a micron to more than 30 microns in diameter. Platelets with such a cavity may be parted along said cavity, thereby producing two pieces virtually free of defects and completely free of screw dislocations.

This invention will be illustrated in greater detail by the following examples of the practice of the invention. Approximately 2 grams of aluminum metal of commercial purity were heated in an alumina boat to between 1300° C. and 1450° C. in a porcelain refractory tube furnace. Hydrogen was admitted to the furnace at a pressure of about one atmosphere with a partial pressure of water of between about $1.2 \times 10^{-4}$ and $3.6 \times 10^{-3}$ atmosphere. After 12 hours under these conditions, the furnace was opened. Relatively large deposits of transparent and translucent crystals were observed surrounding the charges to a distance of about 2 centimeters. Microscopic examination revealed platelets and tubelets embedded in the deposit.

Another charge was prepared having as the aluminum source material, the intermetallic compound titanium aluminide ($TiAl_3$-containing a small excess of aluminum). Under the same heating conditions and time, similar deposits were found around the charge; however the amount of the deposit was more voluminous than those produced by a pure aluminum charge.

The high mechanical properties of these crystals were demonstrated in tests conducted on specimens produced by both of the above outlined methods. The actual testing of the strength of these minute crystals is not conducted along the customary lines of a measured loading. Difficulties in measuring the small loading forces requires the use of a method of testing wherein the crystal is mounted and subjected to measured distortions until rupture of the crystal. With a knowledge of the Young's modulus for alpha-aluminum oxide and the maximum values of the strain, the maximum stress can be approximately determined from Hooke's law.

Elastic strains in excess of 1 percent are the average values obtained for both platelets and needles. The highest recorded strain was 2.3 percent and still higher values may be possible. The Young's modulus for alpha-aluminum oxide is $5.1 \times 10^{-2}$ dyne per cm.$^2$ from which Hooke's law yields a strength of $5.1 \times 10^{10}$ dyne per cm.$^2$, or 738,000 p.s.i., for a 1 percent strain. For the largest strain observed, a strength of $1.17 \times 10^{11}$ dyne per cm.$^2$, or 1,700,000 p.s.i. is found. By comparison, the tensile strength of large single crystals of alpha-aluminum oxide is about 3.1 to $10^9$ dyne per cm.$^2$, or 45,000 p.s.i.

These virtually perfect crystals, in addition to their great strength, also possess exceptional electronic properties, high electrical resistivity, thermal and chemical stability.

From the foregoing description, it is apparent that the instant invention provides a useful process for producing heretofore unknown virtually perfect crystals of alpha-aluminum oxide.

It is to be understood that all matter hereinbefore set forth is to be considered as illustrative and not in a limiting sense, and that all changes and modifications which do not depart from the spirit and scope of the invention be included.

What is claimed is:

1. A method for producing single, high strength, virtually perfect crystals of alpha-aluminum oxide ($\alpha$-Al$_2$O$_3$) comprising the steps of providing a refractory article having thereon an aluminum oxide substrate, intimately contacting said substrate with vaporous aluminum oxide formed by the reaction of an aluminum source material selected from the group consisting of aluminum and the aluminides of zirconium, hafnium, vanadium, niobium, tantalum, chromium, molybdenum, and tungsten at a temperature between 1300° and 2050° C. with an atmosphere consisting of a stream of hydrogen at a pressure of about one atmosphere and water vapor with a vapor pressure to hydrogen gas pressure ratio between $10^{-8}$ to 1 and 1 to 1, whereby the vaporous aluminum oxide condenses on said substrate and disproportionates to liquid aluminum metal and solid aluminum oxide, said solid aluminum oxide being formed as single crystals of alpha-aluminum oxide ($\alpha$-Al$_2$O$_3$).

2. The method of claim 1 wherein the aluminum source material is at a temperature between 1300° and 1450° C.

3. A method for producing single, high strength, virtually perfect crystals of alpha-aluminum oxide comprising the steps of heating to a temperature between 1300° and 1450° C. an aluminum source material selected from the group consisting of aluminum and the aluminides of zirconium, hafnium, vanadium, niobium, tantalum, chromium, molybdenum and tungsten, in a stream of hydrogen at a pressure of about one atmosphere with a partial pressure of water between $1.2 \times 10^{-4}$ and $3.6 \times 10^{-3}$ atmosphere, passing the resultant atmosphere over an aluminum oxide substrate, upon which substrate virtually perfect single crystals of alpha-aluminum oxide ($\alpha$-Al$_2$O$_3$) will form in from 2 to 24 hours.

4. A method in accordance with claim 3 in which said aluminum source material is aluminum metal.

5. A method in accordance with claim 3 in which said aluminum source material is titanium aluminide.

6. A method of producing single, high strength, virtually perfect crystals of alpha-aluminum oxide comprising the steps of heating aluminum metal to a temperature between 1300° and 1450° C. in a stream of hydrogen at a pressure of about one atmosphere with a partial pressure of water of about $1.2 \times 10^{-4}$ atmosphere, passing the resultant atmosphere over an aluminum oxide substrate, upon which substrate virtually perfect single crystals of alpha-aluminum oxide ($\alpha$-Al$_2$O$_3$) form.

7. Needle-like high strength, virtually perfect single crystals of alpha-aluminum oxide ($\alpha$-Al$_2$O$_3$) having a hexagonal cross-section and a length from about 1 to 30 mm. long and a width from about 3 to 50 microns.

8. Needle-like single crystals of alpha-aluminum oxide ($\alpha$-Al$_2$O$_3$) in accordance with claim 7 and having a cylindrical centerline cavity from about 0.5 to 30 microns in diameter.

9. Platelet-like high strength, virtually perfect single crystals of alpha-aluminum oxide ($\alpha$-Al$_2$O$_3$) having a length up to about 10 mm. long and a thickness from about 0.5 to 10 microns.

10. Platelet-like single crystals of alpha-aluminum oxide ($\alpha$-Al$_2$O$_3$) in accordance with claim 9 and having a cylindrical centerline cavity from about 0.5 to 3 microns in diameter.

References Cited in the file of this patent

UNITED STATES PATENTS 2,758,011     Block     Aug. 7, 1956

FOREIGN PATENTS 165,052     Great Britain     Dec. 28, 1921

OTHER REFERENCES

Journal of the American Chemical Society, vol. 76, April 1954, Hock, M., et al., pp. 2560–2561.

Doklady Akad. Nauk, SSSR, 1951, vol. 80, pp. 751–754.

Journal of the American Chemical Society, vol. 73, November 1951, article by Brewer et al., pp. 5308–5315.